United States Patent [19]
Norman

[11] Patent Number: 6,024,461
[45] Date of Patent: Feb. 15, 2000

[54] LAMPHEAD HAVING MULTI-POSITIONAL BASE AND REMOVABLY MOUNTABLE REFLECTOR FLASHTUBE ASSEMBLY

[75] Inventor: William Lester Norman, Burbank, Calif.

[73] Assignee: Norman Enterprises, Burbank, Calif.

[21] Appl. No.: 08/741,569

[22] Filed: Oct. 31, 1996

[51] Int. Cl.[7] .................................................. G03B 15/035
[52] U.S. Cl. ..................... 362/3; 362/6; 362/12; 362/216; 362/228
[58] Field of Search ................... 362/3, 6, 11, 12, 362/16, 18, 216, 226, 227, 368, 373, 374, 376, 228

[56] References Cited

U.S. PATENT DOCUMENTS

| | | | |
|---|---|---|---|
| 4,300,188 | 11/1981 | Addario | 362/226 |
| 5,161,871 | 11/1992 | Baliozian | 362/18 |
| 5,278,744 | 1/1994 | Geboers | 362/348 |

OTHER PUBLICATIONS

"The Flashmaster Location Umbrella Outfit," Product Brochure, Photogenic Machine Company.
"The Novatron Product Catalog," Mar. 1993.
"Pro–3" Product Brochure, Profoto, Stockholm, Sweden.
Product Catalog, Bowens International.
"Dyna–Lite Flash Heads Light Controls Accessories," Product Brochure, Dyna–Lite, Inc., ©1985.
"Speedotorn Black Line," Product brochure, Speedotron, Inc. © 1992.
"Norman Enterprises, Inc.," Product brochure, Norman Enterprises, Inc., ©1989, 1991.
"SinarBron Imaging," Product Catalog, pp. 55–64, ©1995.

*Primary Examiner*—Sandra O'Shea
*Assistant Examiner*—Marshall Honeyman
*Attorney, Agent, or Firm*—Beck & Tysver, P.L.L.P.

[57] ABSTRACT

The present invention discloses a lamphead having a multi-positional base and removably mountable reflector flashtube assembly. The lamphead base is configured to detachably mount to a flashtube assembly such that the flashtube assembly may be interchanged with a second flashtube assembly. The flashtube assembly defines an opening and an inner chamber having a reflective surface. A flashtube is mounted within the inner chamber between the reflective surface and the opening, wherein the reflective surface extends behind the flashtube, thereby increasing the intensity of the light emitted thereby. The lamphead base may be adapted for pivotable mounting on a stand to a full vertical position without interfering with the stand. In addition, the lamphead base may include a rear surface defining one or more holes and a support structure extending rearward from the hole(s), the support structure being capable of supporting the lamp base on a substantially planar surface such that when so supported the hole is spaced from the supporting surface so that the fan may circulate air through the hole for cooling the lamphead.

13 Claims, 8 Drawing Sheets

LAMPHEAD HAVING MULTI-POSITIONAL BASE AND REMOVABLY MOUNTABLE REFLECTOR FLASHTUBE ASSEMBLY

FIELD OF THE INVENTION

The present invention relates generally to lampheads, and more particularly, to a multi-positional base and removably mountable reflector flashtube assembly for a lamphead.

BACKGROUND OF THE INVENTION

Lampheads are typically used in the photography industry for illuminating various objects, including, for example, products, people or rooms. The most desirable illumination depends on, among other things, the intensity of the illumination and the lamphead's positioning, including its height, for example, its distance above a supporting surface such as a floor or ground, and its projection angle of illumination with respect to the supporting surface.

Current lampheads often underutilize the flash power of flashtubes and/or are limited in the use of flashtube housings. In addition, current lampheads typically have bases which undesirably limit the range of motion of a lamphead, i.e., the projection angle, when mounted on a stand and/or undesirably limit the placement of a lamphead when used without a stand. For example, these lampheads are typically not able to tilt to a full vertical position, perpendicular to the supporting surface or parallel to the stand, as the lamphead base typically interferes with a stand and/or the stand itself. In addition, these lampheads typically cannot be positioned upright (fully vertical) on a supporting surface or if so positioned, air is cut off to the cooling fan.

There is thus a need in the photography industry for a multi-positional base structure and removably mountable reflector flashtube assembly for a lamphead. The present invention is directed to these as well as other needs.

SUMMARY OF THE INVENTION

To overcome the limitations of current lampheads as described above, and to overcome other limitations that will become apparent upon reading and understanding the present specification, the present invention discloses a multi-positional base structure and removably mountable reflector flashtube assembly for a lamphead.

In accordance with one aspect of the invention, the present invention provides a lamphead having a base and a flashtube reflector assembly. The lamphead base includes a housing enclosing electrical circuitry, a modeling tube disposed on the housing and extending forwardly therefrom, and an electrical connection disposed on the housing. The electrical connection is adapted for receiving a mating electrical connection on a flashtube assembly for connecting the flashtube assembly with the electrical circuitry. The housing is configured to detachably mount to the flashtube assembly such that the flashtube assembly may be interchanged with a second flashtube assembly.

In accordance with another aspect of the invention, the flashtube reflector assembly comprises a reflector that includes a housing adapted for removably mounting the reflector to the lamphead. The reflector housing defines an opening and an inner chamber having a reflective surface. A flashtube is mounted within the inner chamber between the reflective surface and the opening, wherein the reflective surface extends behind the flashtube, thereby increasing the intensity of the light emitted thereby.

In accordance with yet another aspect of the invention, the lamphead base is adapted for pivotable mounting on a stand. The base includes a rear surface and a perimeter surface adjacent to the rear surface. The perimeter surface of the base defines a recessed portion which is positioned to allow the lamphead to pivot to a full vertical position without interfering with the stand.

In accordance with a further aspect of the present invention, the lamphead base encloses a fan and includes a rear surface defining at least one hole for circulating air to cool the lamphead. The lamp base further includes a support structure extending rearward from the hole. Advantageously, the support structure is capable of supporting the lamp base on a substantially planar surface such that when so supported the hole is spaced from the supporting surface so that the fan may circulate air through the hole for cooling the lamphead.

These and various other features and advantages of the invention are pointed out with particularity in the claims annexed hereto and form a part hereof. However, for better understanding of the invention, its advantages, and the objectives obtained by its use, reference should be made to the drawings which form a further part hereof and to the accompanying descriptive matter, in which there is illustrated and described specific exemplary embodiments in accordance with the invention.

BRIEF DESCRIPTION OF THE DRAWINGS

Referring now to the drawings in which like reference numbers represent corresponding parts throughout.

DETAILED DESCRIPTION OF THE DRAWINGS

In the following description of the exemplary embodiments, reference is made to the accompanying drawings in which there is shown by way of illustration specific embodiments in which the invention may be practiced. It is to be understood that other embodiments may be utilized as structural changes may be made without departing from the scope of the present invention.

Figure 1:
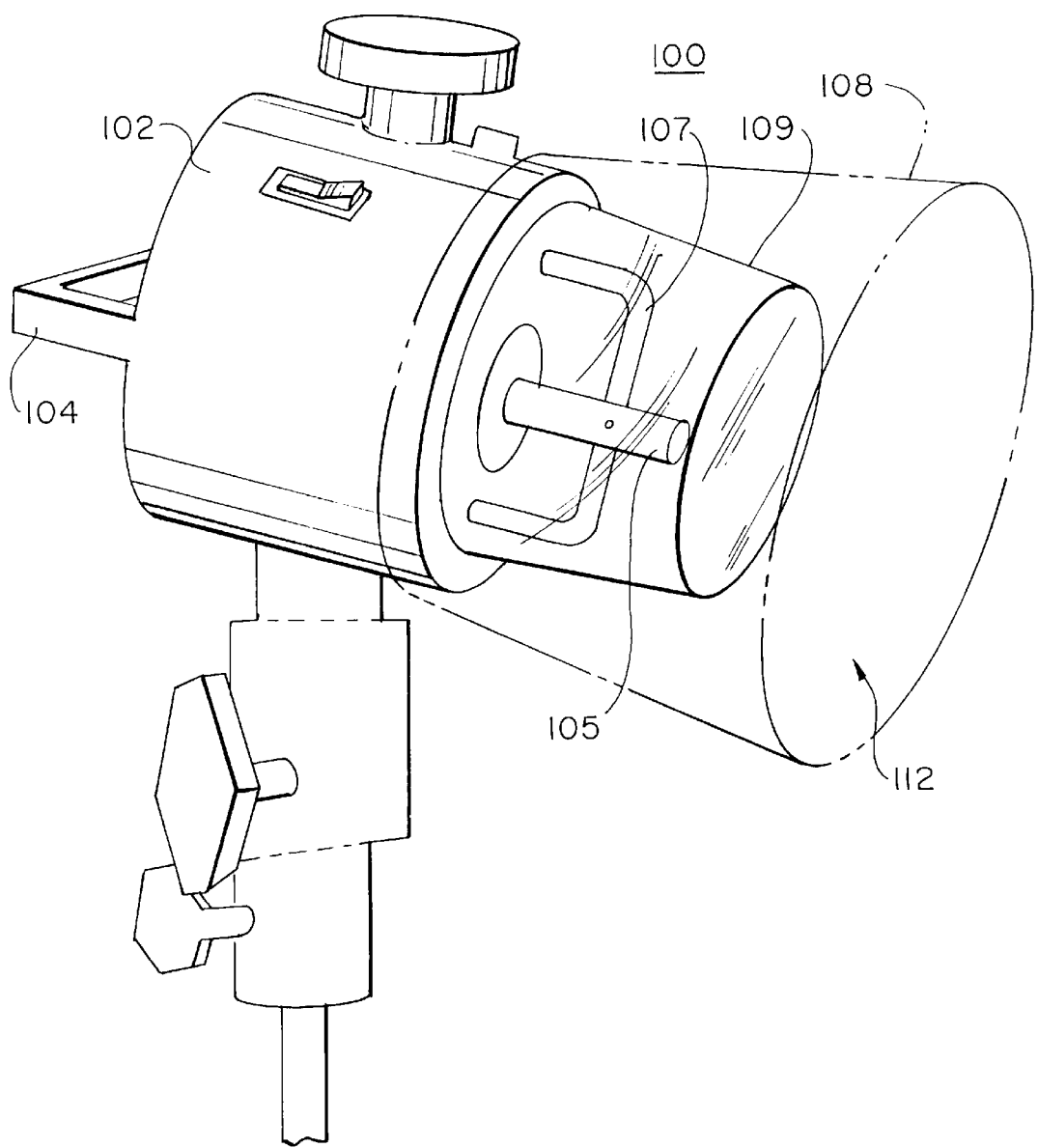
FIG. 1 is perspective view of an exemplary conventional lamphead.

FIG. 1 is perspective view of an exemplary conventional lamphead 100. The conventional lamphead 100 includes a base 102, a handle 104, a modeling tube 105, and a flashtube 107 mounted to the base 102. The base 102 typically houses a fan for cooling the lamphead 100 as well as any electronic circuitry necessary for interfacing the lighting tubes and the fan to a power supply. The flashtube 107 is typically housed in a transparent or translucent glass housing 109 and is usually mounted and electrically connected to the base 102 by pins.

Removably attached to the base 102 (as indicated by the dashed lines) may be a reflector 108. The reflector 108 may come in various shapes in order to provide various lighting effects. The reflector 108 is typically conically-shaped having a rearward opening and a forward opening 112. The rearward opening is usually slipped over the glass housing 109 and attached to the base 102 by suitable means. The reflector 108 typically includes a reflective inner surface 110 for focusing the flashtube illumination forwardly. However, the reflective surface 110 does not extend behind the flashtube 107 because the reflector is slipped over the glass housing 109.

Figure 2:
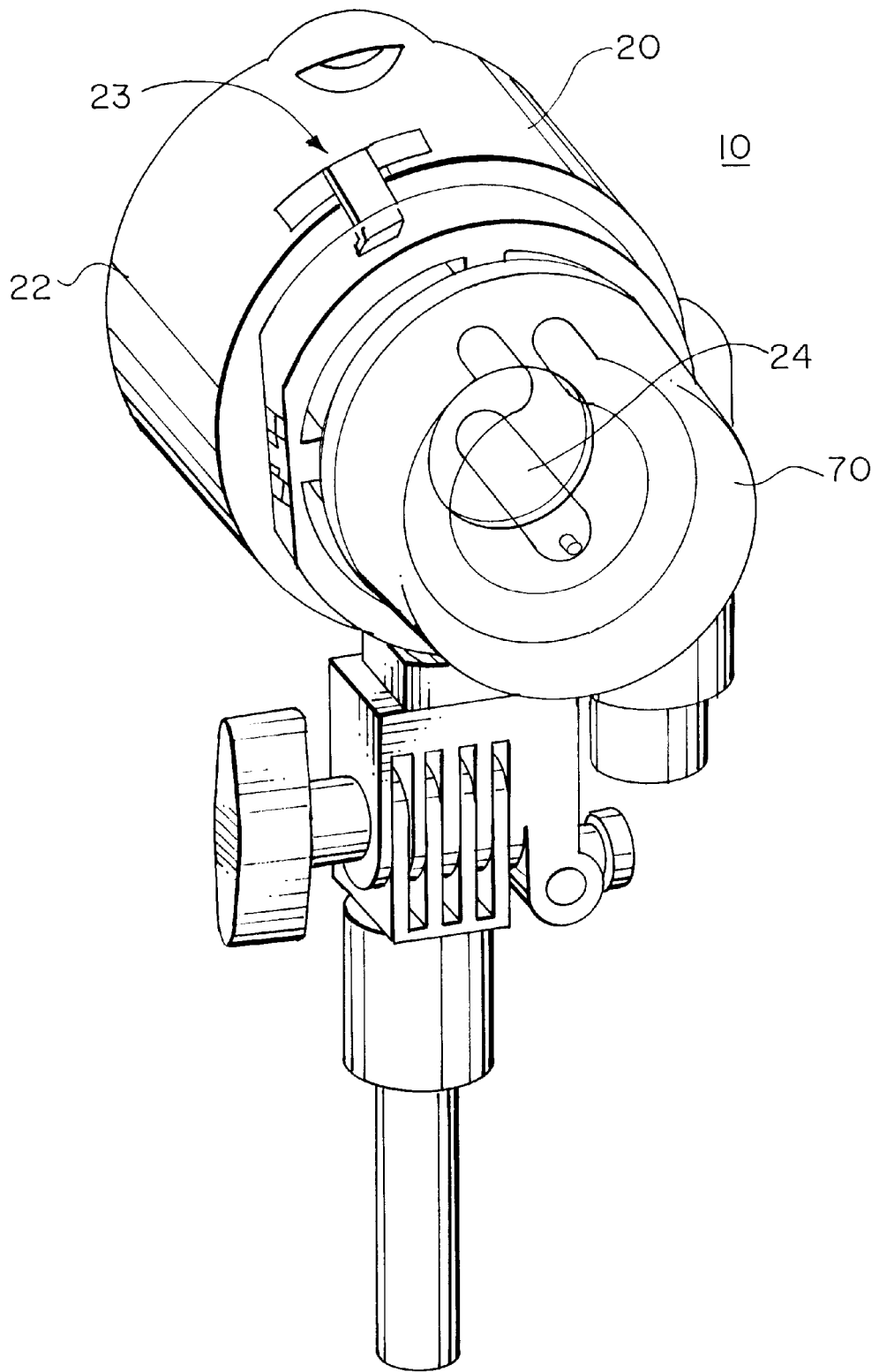
FIG. 2 is an exploded front-side perspective view of an exemplary lamphead in accordance with the principles of the present invention.
Figure 3:
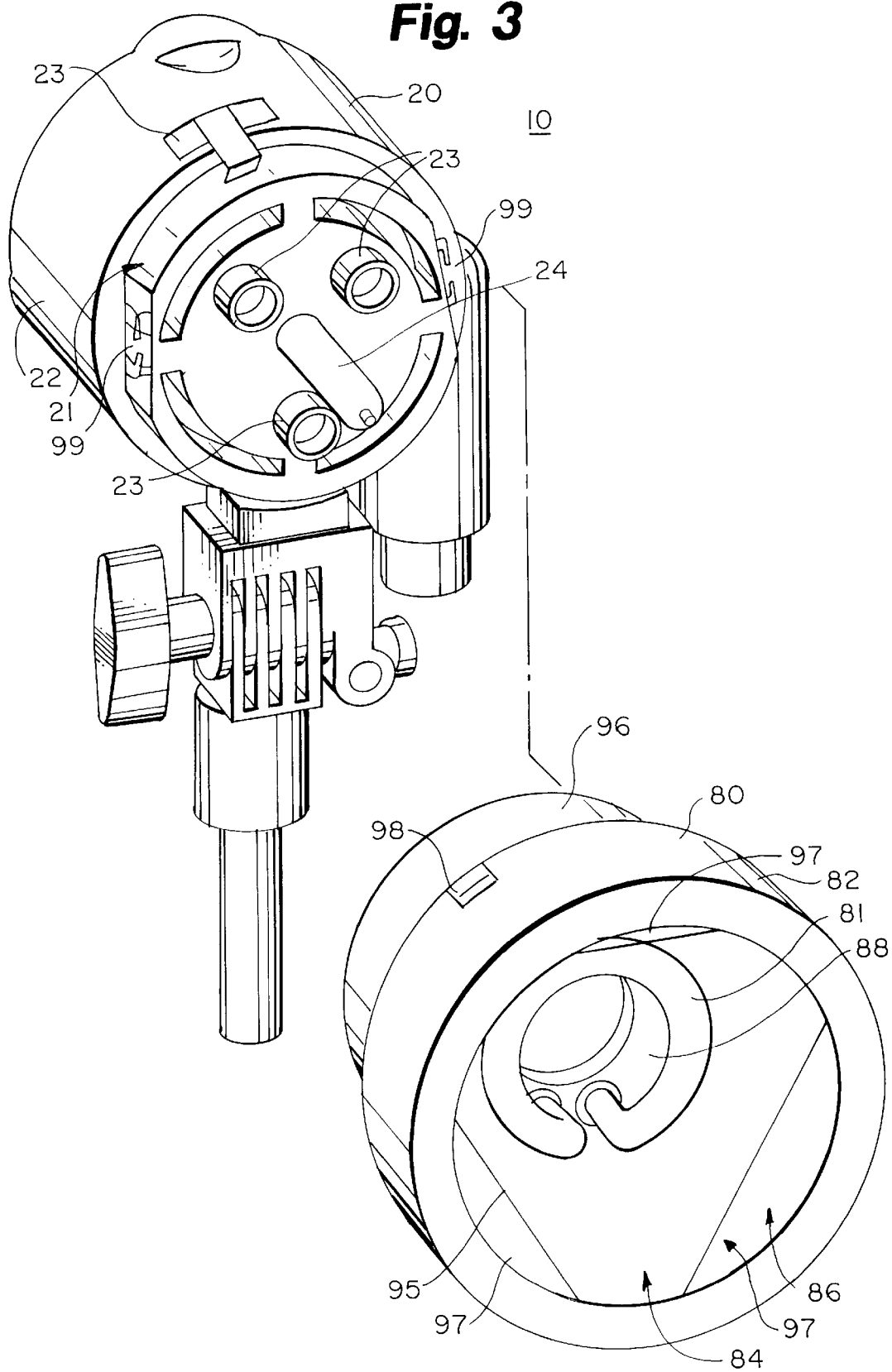
FIG. 3 is an exploded front-side perspective views of another exemplary lamphead in accordance with the principles of the present invention.
Figure 4:
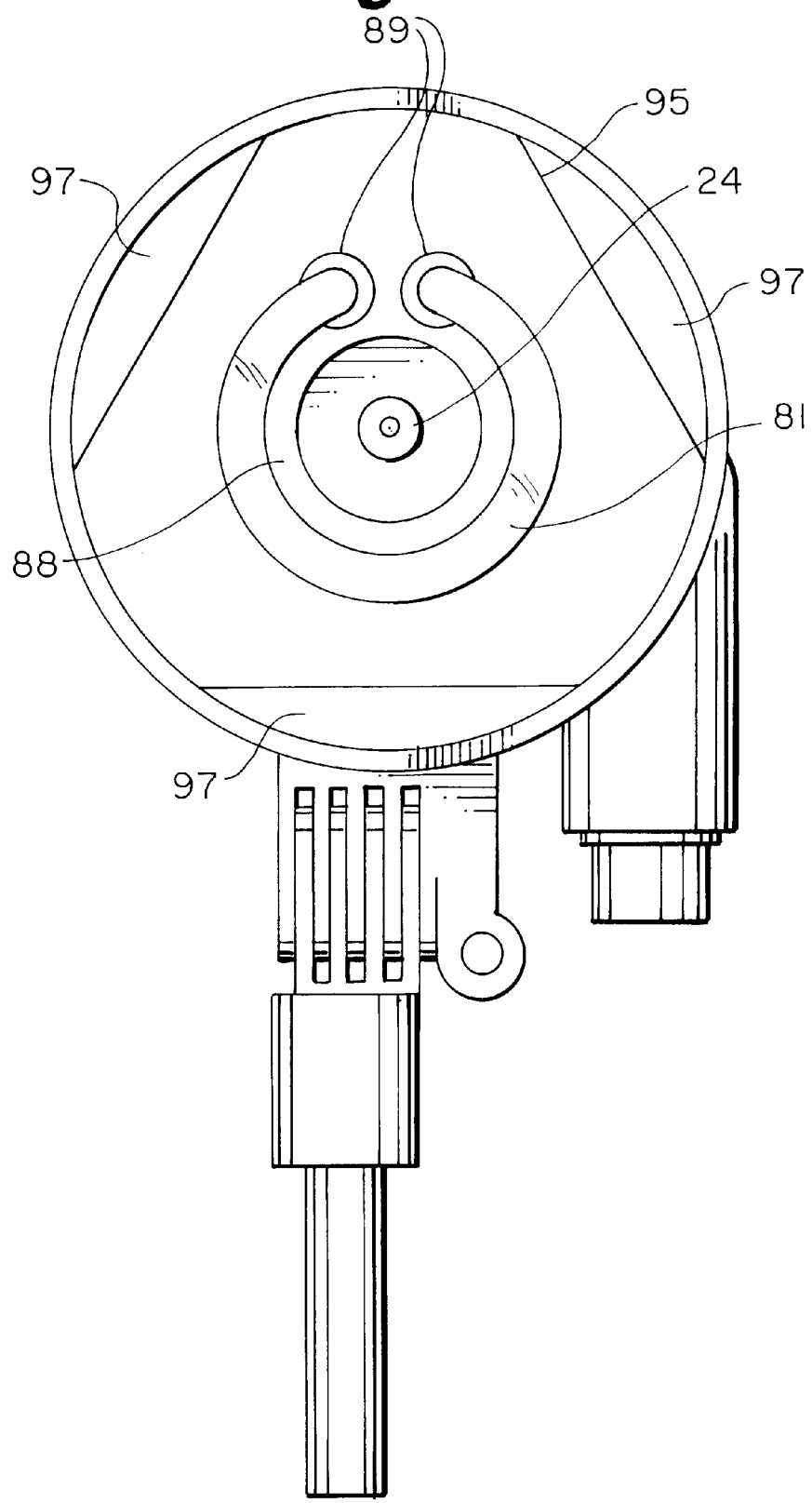
FIG. 4 is a front view of the lamphead of FIG. 3.
Figure 5:
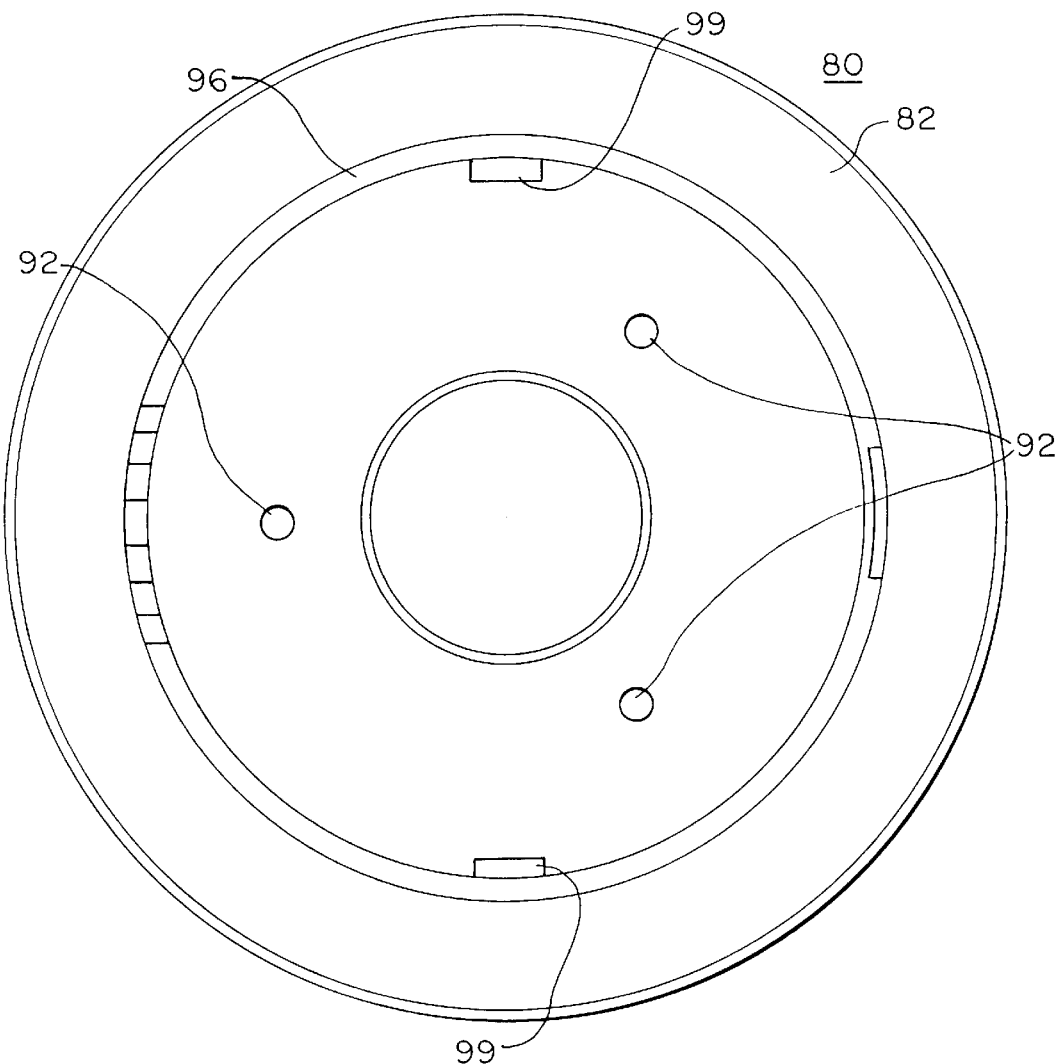
FIG. 5 is a rear view of the flashtube reflector assembly of FIG. 3.

Turning now to FIGS. 2 and 3, there are illustrated perspective views of an exemplary lamphead 10 in accordance with the principles of the present invention. The lamphead 10 comprises a base 20 which may be detachably mounted to a flashtube assembly, such as a basic flashtube assembly 70 (FIG. 2) or a flashtube reflector assembly 80 (FIG. 3).

The flashtube reflector assembly 80 significantly improves the flash intensity of the lamphead 10 by providing a reflective surface behind a flashtube. The interchangeable nature of the lamphead 10 significantly increases the lighting options for a user. A user may use the flashtube reflector assembly 80 when relative high flash intensity is desired, and may interchange the flashtube reflector assembly 80 with the basic flashtube assembly 70 for other lighting effects. Furthermore, a user may use the basic flashtube assembly 70 with conventional reflectors to achieve even more lighting conditions.

The base 20 typically includes a housing 22 enclosing electrical circuitry (not shown), a modeling tube 24 disposed on the housing 22 and extending forwardly therefrom, and one or more electrical connections, such as receptacles 23, disposed on the housing 22 for connecting a flashtube assembly with the electrical circuitry. The base 20 is further configured to mount both the flashtube assemblies 70 and 80 as well as conventional reflectors when used with the basic flashtube assembly 70.

FIG. 2 in particular illustrates the lamphead 10 being used with a basic flashtube assembly 70. Generally, the flashtube assembly 70 is similar to the flashtube/glass container assembly of FIG. 1. The flashtube assembly 70 includes one or more electrical connections, such as electrical pins, which mate with the electrical connection(s) on the base 20 to electrically couple the flashtube assembly to the electrical circuitry. In the exemplary embodiment, the electrical pins are received by the electrical receptors 23 of the base 20 to both electrically couple the flashtube assembly 70 to the electrical circuitry and securely mount the flashtube assembly 70 to the base 20.

It should be appreciated however that the electrical coupling and mounting of the flashtube assembly 70 to the base 20 may be spread out over different structures. In addition, the present invention is not limited to the electrical connections illustrated but extends to cover any type of electrical connection provided that the flashtube assembly 70 is readily detachable from the lamphead base 20.

FIGS. 3–8 illustrate the lamphead 10 in use with a flashtube reflector assembly 80 in accordance with the principles of the invention. The flashtube reflector assembly 80 includes a flashtube 81 mounted within a housing 82 that is adapted for removably mounting the flashtube reflector assembly 80 to the lamphead base 20. The detachable mounting of the flashtube reflector assembly 80 enables the lamphead 10 to be interchangeably used with other flashtube assemblies, such as the basic flashtube assembly 80 discussed above. The other flashtube assemblies may in turn be used with conventional reflectors, thus allowing the lamphead 10 to be used for a wide range of lighting schemes.

The housing 82 of the flashtube reflector assembly 80 typically defines a forwardly facing opening 84 and a generally concave inner chamber 86 having a reflective surface 88. The flashtube 81 is mounted within the inner chamber 86, between the reflective surface 88 and the opening 84. The integral reflector and flashtube assembly 80 thus provides a reflective surface 88 directly behind the flashtube 81, thereby reflecting more of the flashtube light forward and significantly increasing the intensity of the light emitted by the lamphead 10.

As shown in the exemplary embodiment, the flashtube 81 may be mounted to the reflector housing 82 by passing through holes 89 in the reflective surface 88 and connecting to a second surface 90 of the housing 82. The second surface 90 may include electrical connections, such as electrical pins 92, to which the flashtube 81 may be coupled for electrically connecting the flashtube 81 to the lamphead base 20. Similar to those of the basic flashtube assembly 70, the electrical pins 92 are provided by way of example and may also facilitate mounting of the flashtube reflector 80 to the base 20. Both the second surface 90 and the reflective surface 88 may define holes through which the modeling tube 24 may be disposed when the flashtube reflector assembly 80 is mounted to the lamp base 20.

To further secure the flashtube reflector assembly 80 to the base 20, the housing 82 may include a cylindrically extending portion 96 adapted to receive a portion 21 of the base 20. In addition, the base 20 and reflector housing 82 may include a retaining means, such as a clip 23 and notch 98 assembly, as well as an alignment means, for example a slot and groove assembly 99, for facilitating the mounting the of the reflector housing 82 by aligning the retaining means and the electrical connections.

The flashtube reflector assembly may further include a cover 95 disposed in the opening 84 for protecting the flashtube 82. The cover 95 may be transparent or translucent and may also include or form a light filter. Preferably the cover 95 defines one or more holes 97 for ventilating the heat generated by the flashtube 81. The hole(s) 97 may be formed by a gap between the cover 95 and the reflector housing 82 as shown in the illustrated embodiment. In other embodiments, one or more holes may be integrally formed in the cover 95 and/or provided in the reflector housing 82 in addition to or in place of the hole(s) 97.

Figure 6:
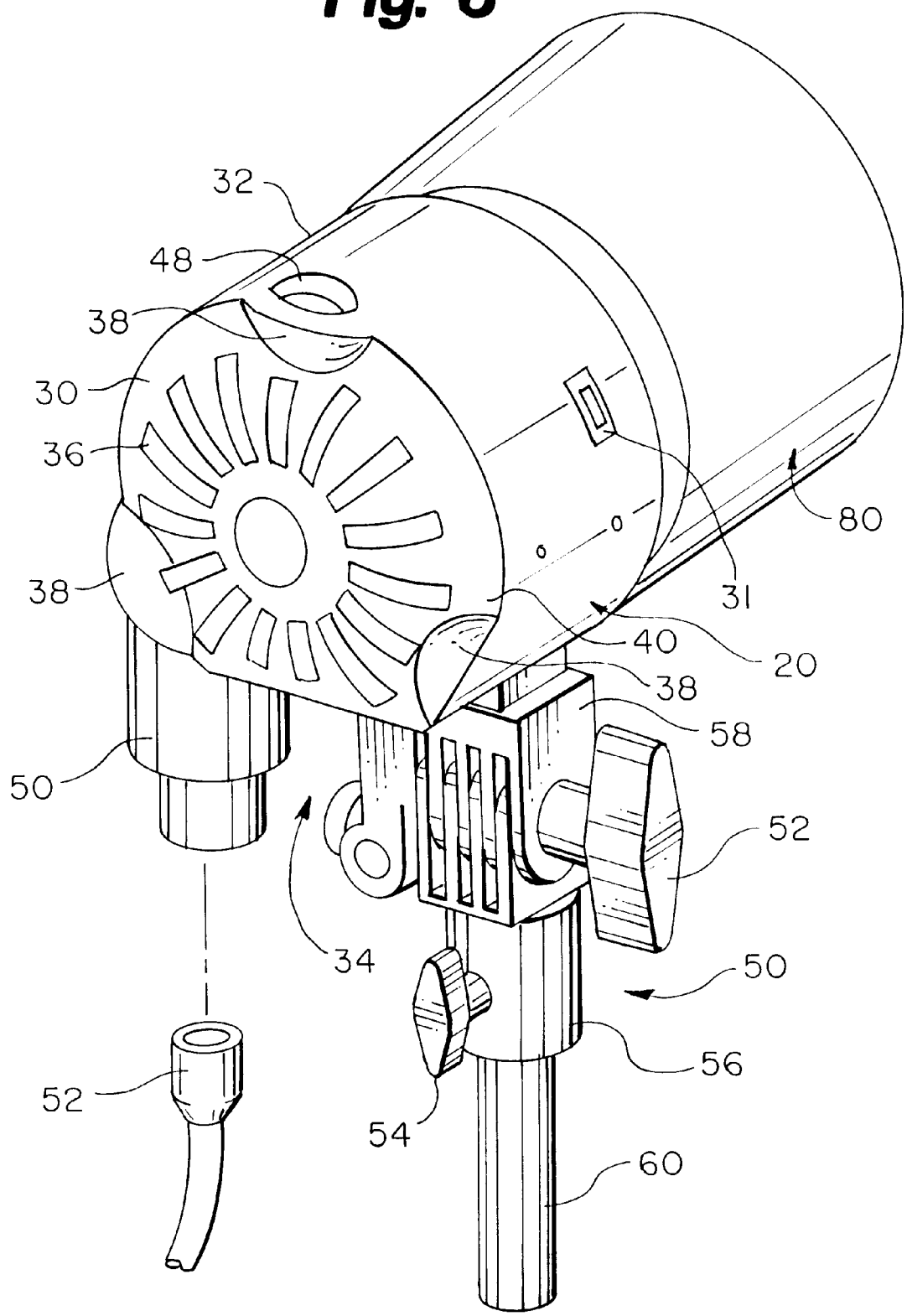
FIG. 6 is a rear perspective view of the lamphead of FIG. 3.
Figure 7:
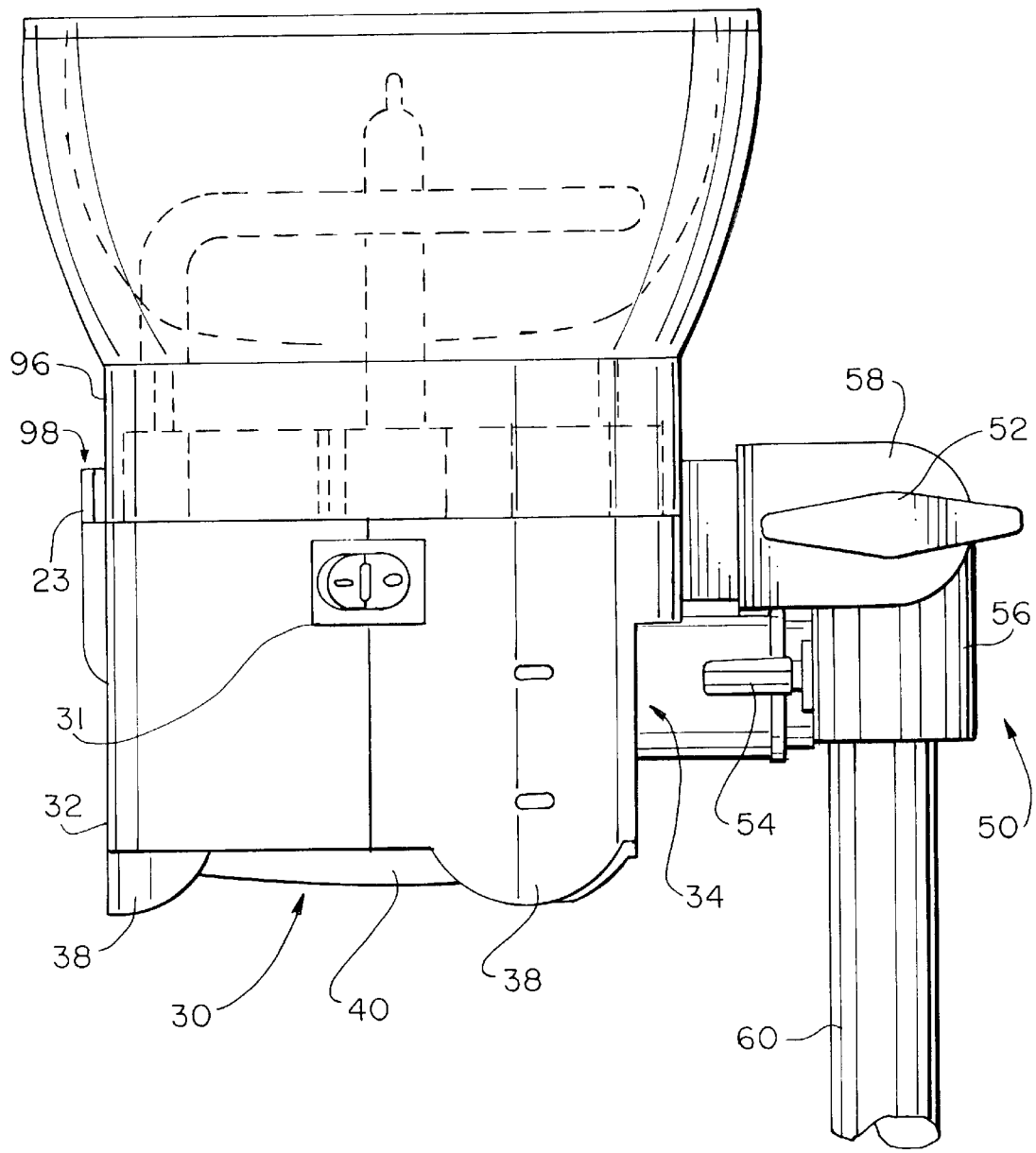
FIG. 7 is a side view of the lamphead of FIG. 3 in a full vertical position supported on a supporting surface.
Figure 8:
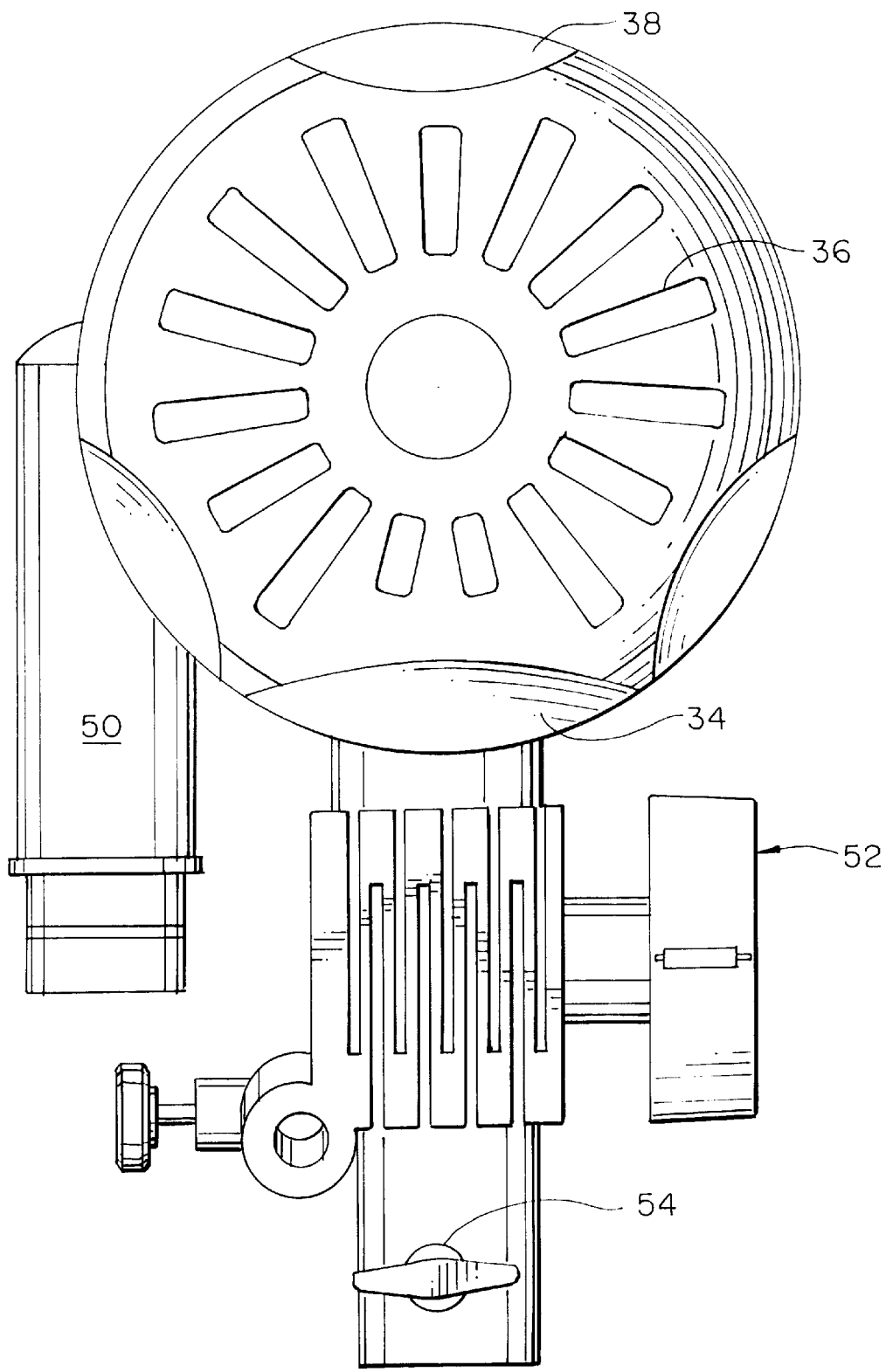
FIG. 8 is a rear view of the lamphead of FIG. 3.

FIGS. 6–8 also illustrate further inventive features of lamphead base 20. Typically, the lamp base 20 is attached to or integrally formed with a stand adapter 50 for mounting lamphead 10 to a stand 60. Stand adapter 50 typically includes an upper portion 58 integrally molded with or attached to the lamphead base 20 and a lower portion 56 adapted for mounting to the stand 60. Upper portion 58 and lower portion 56 are typically pivotably connected to allow lamphead 10 to pivot about axis perpendicular to the longitudinal axis of stand 60.

A first pivot lock 52, which doubles as a lock and hinge, may be provided for adjusting and securing lamphead 10 at a particular projection angle. A second pivot lock 54 is typically provided for adjustably securing lamphead 10 to various positions about the longitudinal axis of stand 60. For a user's convenience, pivot lock 52 is typically disposed to one side of stand adapter 50 while pivot lock 54 is typically disposed on a rear face of stand adapter lower portion 56. In this manner, pivot locks 52 and 54 do not interfere with one another and are easily accessible by the user. For example, neither pivot lock is placed on the front face of stand adapter 50 as this may result in poor accessibility when a reflector is attached to the lamp base 20.

As shown in FIG. 6, exemplary lamphead base 20 may include a rear surface 30 and a perimeter surface 32 adjacent rear surface 30. Perimeter surface may be generally cylindrical in shape and may have an on/off switch 31 disposed to one side. Perimeter surface 32 may include a recessed portion 34 positioned about the perimeter so as to allow the lamphead base 20 to pivot to a full vertical position without interfering with stand 60 or stand adapter 50, as shown in FIG. 8. Recessed portion 34 is typically disposed along the bottom of perimeter surface 32 and may cooperate with an upper portion 58 of stand adapter 50 to allow full vertical positioning of lamphead 10. For example, stand adapter upper portion 58 may provide an initial clearance for lamphead base 20 so that lamphead base 20 does not contact lower portion 56 of stand adapter 50 or stand 60 itself, and recessed portion 34 may provide an additional clearance for components of stand adapter 50 including, for example, pivot lock 54.

In alternate embodiments, upper portion 58 of stand adapter 50 may be lengthened and/or pivot lock 54 may be repositioned, to allow full vertical positioning of lamphead 10 when disposed on a stand 60. However, these alternate configurations may suffer some drawbacks, for example, inconvenient positioning of pivot lock 54 for the user.

The lamphead base rear surface 30 may define one or more holes 36 for circulating air to cool the lamphead 10 and a support structure extending rearward from the hole for supporting the lamp base on a substantially planar surface such that when so supported the hole is spaced from the supporting surface so that the fan may circulate air through the hole for cooling the lamphead.

In the exemplary embodiment, the support structure includes two or more legs 38 disposed about the perimeter of the rear surface 30. However, it should be appreciated that other support structures may be used without departing from the invention, for example, the rear surface 30 itself may function as the support structure.

The rear surface 30 of the lamphead base 20 may further include a tapered portion 40 which includes at least a portion of the hole(s) 36. The tapered portion 40 provides the hole(s) 36 with a component perpendicular to the supporting surface thereby facilitating the circulation of air through the hole.

Lamphead base 20 may further include a cord adapter 50 for receiving a power cord 52. Cord adapter 50 is disposed on lamphead base 20 so as not to interfere with stand 60 or stand adapter 50 when lamphead 10 is pivoted to a full vertical position. In addition, as explained more fully below, cord adapter 50 may also be disposed on lamphead 10 so as to allow lamphead 10 to rest upright on a supporting surface.

The cord adapter 50 may be disposed about the perimeter surface 32 and extend downwardly from lamphead base 20, as best shown in FIG. 6. However, it should be appreciated that cord adapter 50 may take any number of forms so long as it does not interfere with stand 60 or stand adapter 50 or extend beyond the rearmost portion of the base 20 (which would likely prevent the base from resting on a supporting surface). For example, cord adapter 50 may alternatively be a female receptacle on perimeter surface 32, which receives a power cord and still allows full vertical positioning of lamphead 10 either on stand 60 or a supporting surface.

As best shown in FIG. 6, the lamphead base 20 may further include a recessed portion 48 on the perimeter surface 32 of the base 20, for example, at the top of base 20. The recessed portion 48 may cooperate with recessed portion 34 to provide an effective means for hand carrying lamphead 10, thus eliminating a need for a separate handle.

The foregoing description of embodiments of the present invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but rather to extend to cover the full and fair scope of the claims set forth below.

What is claimed is:

1. A lamphead, comprising:

a flashtube reflector assembly including a reflector having a housing adapted for removably mounting the reflector to the lamphead, the housing including a first electrical connection and defining an inner chamber and an opening, the inner chamber having a reflective surface, a flashtube mounted within the inner chamber between the reflective surface and the opening, wherein the reflective surface extends behind the flashtube, thereby increasing the intensity of the light emitted thereby; and a base having a housing enclosing electrical circuitry and a second electrical connection disposed on the housing, the second electrical connection mating with the first electrical connection for connecting the flashtube with the electrical circuitry;

wherein the base housing is configured to detachably mount the flashtube reflector assembly on the base such that the flashtube assembly may be interchanged with a second flashtube assembly.

2. The lamphead of claim 1, wherein the flashtube reflector assembly housing further includes a cylindrically extending portion adapted to receive a portion of the base housing to facilitate a secure mounting of the reflector assembly to the base.

3. The lamphead of claim 1, wherein the base is configured to mount reflectors of the type which do not have a planar reflection surface behind the location of the flashtube, when the second flashtube assembly is mounted on the base.

4. The lamphead of claim 2, further including means for aligning the flashtube reflector housing with the base housing to facilitate mounting of the flashtube reflector to the base by aligning the first and second electrical connections.

5. The lamphead of claim 4, wherein the aligning means includes a slot and groove assembly a portion of which is disposed on the reflector assembly housing and a portion of which is disposed on the base housing.

6. The lamphead of claim 2, further including a retaining means for securing the reflector assembly to the base, the retaining means including a clip and notch assembly.

7. A flashtube reflector assembly removably mountable on a lamphead base, the lamphead base having one or more electrical connections, the assembly comprising:

a reflector housing adapted for removably mounting the flashtube reflector assembly to the lamphead, the housing defining an inner chamber and an opening, the inner chamber having a reflective surface;

a flashtube mounted within the inner chamber positioned between the reflective surface proximate the housing and the opening, wherein the reflective surface extends directly behind the flashtube, thereby increasing the light intensity of the light emitted thereby.

8. The flashtube reflector assembly of claim 7, wherein the reflector housing further includes a mounting surface, the mounting surface including one or more electrical connections for coupling the flashtube with the electrical connections on the base.

9. The flashtube reflector assembly of claim 8, wherein the reflective surface defines one or more holes and wherein the flashtube is disposed through the reflective surface holes and mounted to the mounting surface.

10. The flashtube reflector assembly of claim 8, wherein the base electrical connections include electrical receptors and the mounting surface electrical connections include conductive pins which are received by the electrical receptors when the flashtube reflector assembly is mounted to the base.

11. The flashtube reflector assembly of claim 8, wherein the base includes a modeling tube and the reflective surface further defines a central hole through which the modeling tube is disposed when the flashtube reflector assembly is mounted to the base.

12. The flashtube reflector assembly of claim 8, wherein the reflector assembly housing further includes a cylindrically extending portion adapted to receive a portion of the base into engagement to facilitate a secure mounting of the reflector assembly to the base.

13. The flashtube reflector assembly of claim 7, further including a cover disposed in the opening for protecting the flashtube, the cover defining at least one hole for ventilating the heat generated by the flashtube, wherein the hole comprises a gap formed between the cover and the inner chamber.

* * * * *